(12) United States Patent
De Hazan et al.

(10) Patent No.: US 6,467,312 B1
(45) Date of Patent: Oct. 22, 2002

(54) SOL GEL METHOD OF MAKING AN OPTICAL FIBER WITH MULTIPLE APETURES

(75) Inventors: Yoram De Hazan, Oley, PA (US); John Burnette MacChesney, Lebanon, NJ (US); Thomas Edward Stockert, Millburn, NJ (US); Dennis J Trevor, Clinton, NJ (US); Robert Scott Windeler, Annandale, NJ (US)

(73) Assignee: Fitel USA Corp., Norcross, GA (US)

( * ) Notice: Subject to any disclaimer, the term of this patent is extended or adjusted under 35 U.S.C. 154(b) by 239 days.

(21) Appl. No.: 09/613,320

(22) Filed: Jul. 11, 2000

(51) Int. Cl.[7] .............................................. C03B 37/025
(52) U.S. Cl. ........................................... 65/395; 65/17.2
(58) Field of Search .................................. 65/395, 17.2

(56) References Cited

U.S. PATENT DOCUMENTS

| | | | | |
|---|---|---|---|---|
| 5,802,236 A | * | 9/1998 | DiGiovanni et al. | 385/125 |
| 5,907,652 A | | 5/1999 | DiGiovanni et al. | 385/125 |
| 5,922,099 A | * | 7/1999 | Yoon et al. | 425/468 |
| 6,299,822 B1 | * | 10/2001 | Yoon et al. | 264/102 |
| 2001/0029756 A1 | * | 10/2001 | Paek et al. | 65/395 |
| 2001/0054681 A1 | * | 12/2001 | Hamada | 250/227.11 |

FOREIGN PATENT DOCUMENTS

EP  0 652 184 A1  5/1995  ........... C03B/19/12

OTHER PUBLICATIONS

Abramov et al., *Electronics Letters*, : Widely Tunable Long–Period Fibre Gratings, vol. 35, No. 1, pp. 81–82, Jan. 7, 1999.
Abramov et al., IEEE Photonics Technology Letters, "Electrically Tunable Efficient Broad–Band Fiber Filter", vol. 11, No. 4, pp. 445–447, Apr. 4, 1999.
Espindola et al., *Electronics Letters*, "External Refractive Index Insensitive Air–Clad Long Period Fibre Grating", vol. 35, No. 4, pp. 327–328, Feb. 18, 1999.
European Patent Office Search Report, Application No. 01300525.1–2309, The Hague Sep. 13, 2001.

* cited by examiner

*Primary Examiner*—John Hoffmann
(74) *Attorney, Agent, or Firm*—Eugen E. Pacher

(57) ABSTRACT

The disclosed method of making microstructured optical fiber comprises providing a mold, with a multiplicity of elongate elements extending into the mold and being maintained in a predetermined spatial arrangement with respect to the mold. Silica-containing sol is introduced into the mold and is caused to or permitted to gel, such that a gel body results. After removing the elongate elements from the gel body and removing the gel body from the mold, the gel body is dried, sintered and purified, and the microstructured fiber is drawn from the sintered body.

12 Claims, 5 Drawing Sheets

SOL GEL METHOD OF MAKING AN OPTICAL FIBER WITH MULTIPLE APETURES

FIELD OF THE INVENTION

This invention pertains to methods of making microstructured optical fibers.

BACKGROUND

Microstructured optical fibers are known. See, for instance, A. A., Abramov et al., *Electronics Letters*, Vol. 35(1), Jan. 7, 1999, pages 81–82; and R. P. Espindola et al., *Electronics Letters*, Vol. 35(4), Feb. 18, 1999, pages 327–328.

Briefly, microstructured fibers comprise features (exemplarily but not necessarily air filled holes) that are axially oriented and typically extend the length of the fiber. Such fibers can have unique properties for at least two reasons. First, a large refractive index difference ($\Delta n \sim 0.45$) occurs at the internal air/silica interfaces. This can provide the fiber with optically inactive regions, and with large numerical aperture. Second, the holes can be filled with appropriate materials to actively control the optical properties of the fiber. See, for instance, A. A. Abramov et al., IEEE Photonics Technology Letters, Vol. 11(4), pages 445–447, April 1999. Microstructured fibers are advantageously used in optical devices and sensors, e.g., as optical bandgap material, dispersion compensating fiber, high intensity lasers and amplifiers, and continuum generation fibers.

Prior art microstructured fibers are typically made by a very labor-intensive method, comprising bundling together glass tubes and, typically, a glass core rod, to form the desired geometry. See, for instance, U.S. Pat. No. 5,907,652. The process frequently involves extensive handling of the assembly by the fabricator, frequently resulting in contamination of the assembly, and requiring several cleaning steps. Furthermore, prior art assemblies typically are relatively short (e.g., 0.3 m), compared to standard preform lengths (typically 1 m or more).

The prior art method of making microstructured fiber typically also comprises collapsing an overclad tube over the assembly, such that the rod and tubes are held together. The resulting preform is then drawn into fiber, typically under conditions such that the interstitial regions collapse, and the tubes remain open due to pressure that builds up in each separate tube.

It will be appreciated that the prior art method has shortcomings. For instance, there are only a few geometries (e.g., hexagonal) that are relatively easy to make with the prior art "bundle and overclad" technique. Furthermore, for microstructured fiber to be used in applications that require more than a few meters of fiber, it will be necessary to lower the content of impurities which affect the fiber's background loss and strength. Still furthermore, it is difficult to make large preforms (>0.3 m, desirably ~1 m) length by the prior art bundle and overclad method.

In view of the potential usefulness of microstructured fiber it would be desirable to have available a method of making such fiber that is not subject to, or at least less subject to, the shortcomings of the prior art method. For instance, it would be desirable to have a method that is less prone to contamination, and is less operator dependent. Furthermore, it would be desirable to have a method that is capable of making non-symmetrical microstructured fiber. This application discloses such a method.

All cited references are incorporated herein by reference.

SUMMARY OF THE INVENTION

The invention is embodied in an improved method of making microstructured optical fiber. The method comprises providing a vessel (exemplarily, but not necessarily, tube shaped) having a length and an inner diameter, and that furthermore comprises two or more elongate elements (exemplarily rods, tubes, wires or fibers) extending at least a portion of the length of the vessel and being maintained in a predetermined spatial arrangement with respect to the vessel. The method also comprises at least partially filling the vessel with the elongate elements therein with a silica-containing sol, and permitting or causing the sol to gel, such that a gel body results, with the elongate elements embedded in the gel. The method further comprises separating the gel body from the vessel and the elongate elements (exemplarily with the aid of a release agent), drying, purifying and sintering the gel body, and drawing the microstructured optical fiber from the sintered gel body.

In an exemplary embodiment of the inventive method the elongate elements are rods or rod-like objects including tubes, exemplarily glass rods or steel rods, that are maintained in the desired spatial arrangement by holding fixtures, exemplarily a bottom and a top end cap with appropriately located holes and recesses. The vessel typically is a tubular vessel, with the bottom opening of the vessel closed off by a removable cap or other appropriate closing means. The top holding fixture typically is axially movable to facilitate removal of the elongate elements from the gel body.

In a further exemplary embodiment of the inventive method the elongate elements are physically, chemically or thermally removable elongate elements, e.g., polymer rods or fibers, and the method comprises removing said elongate elements after gelation of the sol by, e.g., pyrolysis or chemical action.

It will be understood that the elongate elements need not to be of circular cross section, and need not all have the same sizes and/or shapes. Furthermore, it will be understood that the elongate elements need not be removed from the gel body all at the same time.

It is anticipated that the inventive method will be able to provide gel bodies of length and diameter similar to those of state of the art monolithic (i.e., without multiple through holes) gel bodies, and typically also longer and/or thicker than prior art microstructured fiber preforms.

It will be appreciated that the below described means for the practice of the inventive method are exemplary only, and that those skilled in the art will be readily able to design and build means that meet special requirements, e.g., particular arrangements of the elongate elements. Indeed, it will undoubtedly be appreciated that substantially any arrangement of the elongate elements can be produced with the same basic apparatus, for instance, by providing holding fixtures that reflect the desired arrangement of the elongate elements.

The method according to the invention frequently has further advantages over the prior art method of making microstructured optical fiber. For instance, the former lends itself to mass production of relatively large preforms. The former also uses relatively cheap raw materials that nevertheless have relatively high purity, approaching that of conventional optical fiber. The former also is substantially operator-independent.

BRIEF DESCRIPTION OF THE DRAWINGS

FIGS. 1–4 and 6–8 are not intended to be to scale or in proportion.

DETAILED DESCRIPTION OF SOME EXEMPLARY EMBODIMENTS

Figure 1:
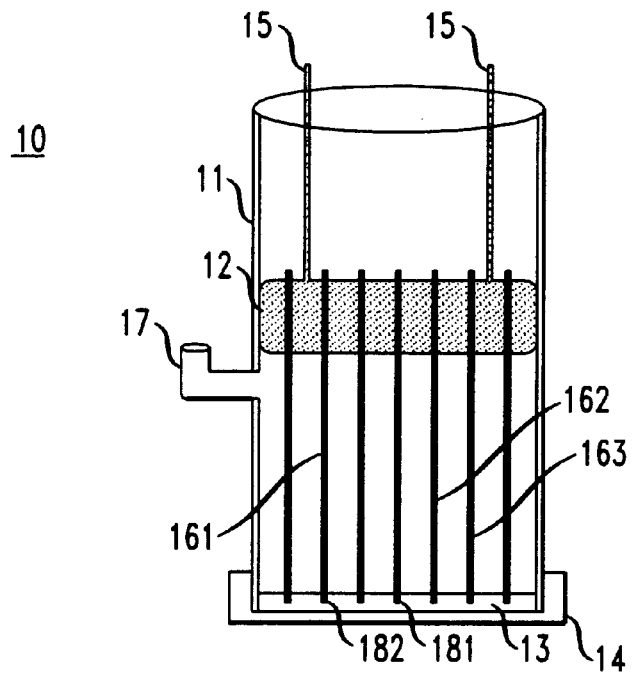
FIGS. 1–4 schematically depict intermediate steps in the practice of a preferred exemplary embodiment of the method according to the invention.

FIGS. 1–4 schematically depict some steps of a currently preferred embodiment of the method according to the invention. FIG. 1 shows a vessel 10 (frequently to be referred to as a "mold") that is ready to receive the sol. Numeral 11 refers to a (typically cylindrical) vessel, e.g., an acrylate, silica or steel tube. Numeral 12 refers to an upper holding fixture that is slideable within vessel 11 and maintains rod-shaped elongate elements 161, 162, 163 etc. axially aligned in a desired spatial arrangement that replicates the arrangement of recesses 181, 182, . . . in lower holding fixture 13. Recesses 181, 182, . . . receive the elongate elements 161, 162, . . . Removable end cap 14 holds fixture 13 in place. Cap 14 not only serves to hold fixture 13 in a desired spatial arrangement but also serves to prevent leakage of the sol from the vessel. Optional rods 15 serve to move upper holding fixture 12 axially within the vessel. Exemplarily, the upper and lower holding fixtures are made of TEFLON. Orifice 17 is provided to facilitate introduction of sol into the mold, and also to facilitate introduction of pressurized water into the space between upper holding fixture 12 and the gelled sol. Alternatively, an additional orifice, exemplarily located at the end cup 14, is used to fill the mold, either singly or in tandem with one or more other orifices.

Figure 2:
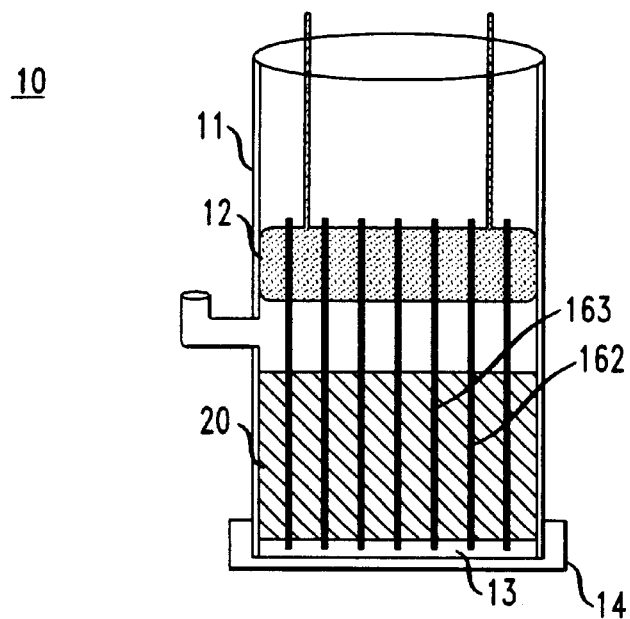
Figure 3:
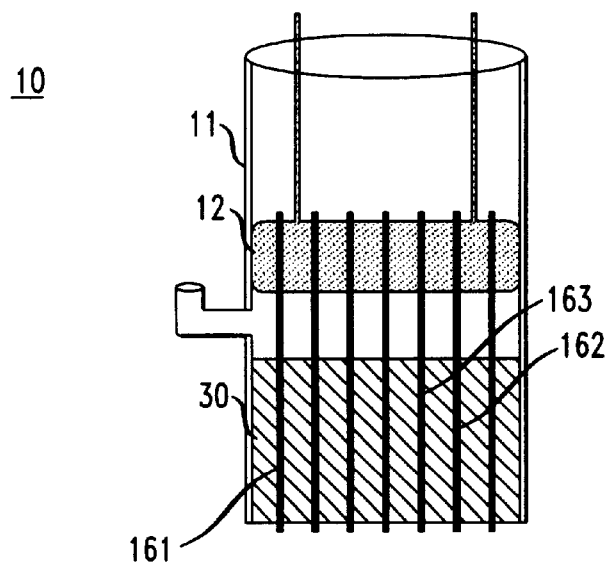
Figure 4:
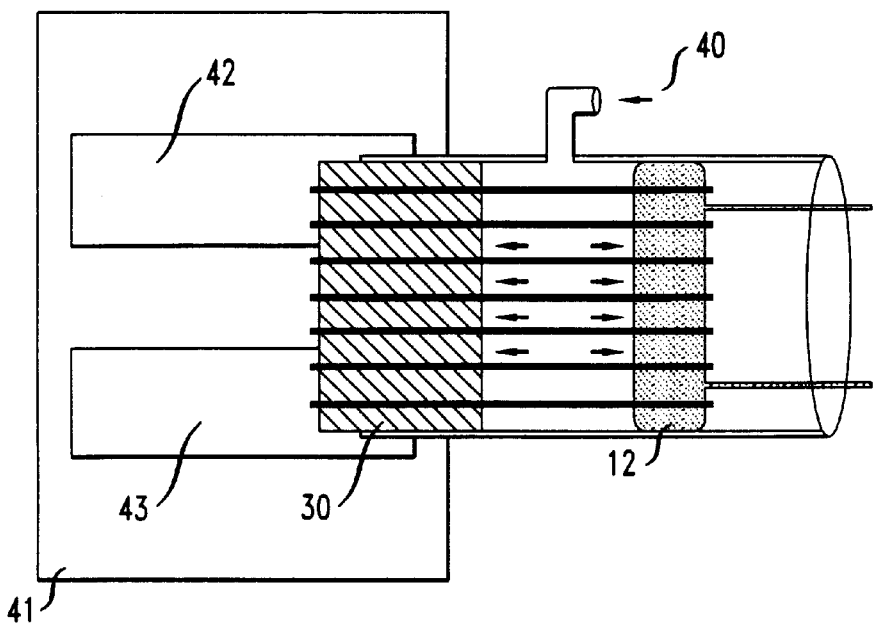
Figure 5:
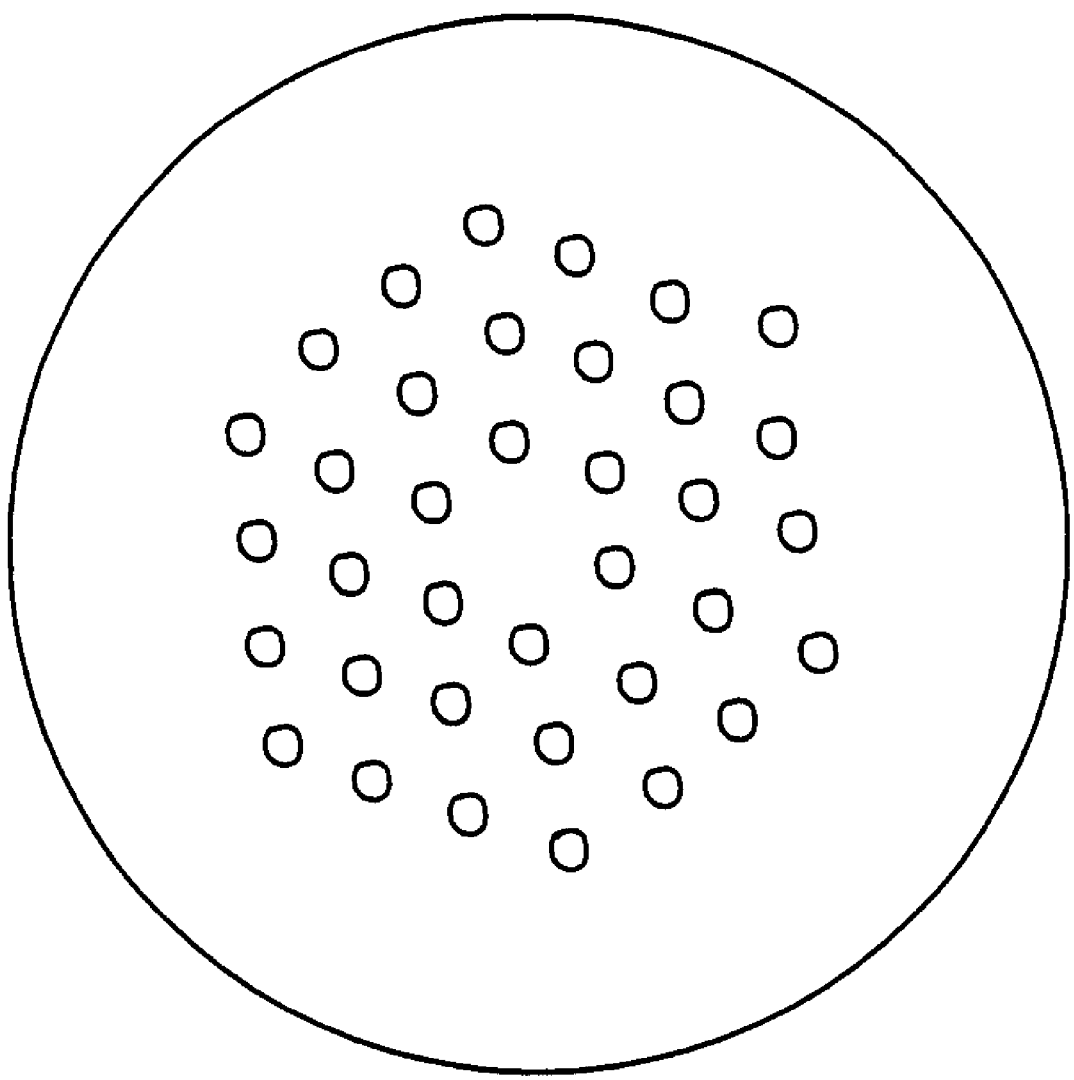
FIG. 5 shows the cross-sectional view of a microstructured optical fiber made according to the method of the invention.

FIG. 2 shows the mold after introduction of sol 20, FIG. 3 shows the mold after formation of gel 30 and after removal of holding fixture 13 and end cap 14 in preparation for removal of the aged gel body 30 from the mold. Removal is accomplished by any suitable method, exemplarily by introduction of pressurized water into orifice 17, thereby forcing apart the gel body and the upper holding fixture 12. This is shown schematically in FIG. 4. It will be understood that exemplarily the rods 161 etc., remain fixed in upper holding fixture 12, whereas aged gel body 30 is forced axially out of the vessel. However, alternatively, the elongate elements could be removed prior to removal of the gel body from the mold. The resulting aged gel body advantageously is received by a conventional collection device (exemplarily comprising rollers 42, 43) in a water bath 41. Exemplarily, the gel is aged for a period, sufficient to result in syneresis, wherein the gel shrinks and water is expelled. The expelled water can serve as lubricant that aids in the removal of the gel body from the mold. Removal of the gel body typically is also facilitated by application of one or more known mold release substances, e.g., polyethylene, silicon or TEFLON spray, or a chrome coating.

After removal of the gel body from the mold and transforming the gel body into a glass body (preform) by drying, sintering and purifying, microstructured optical fiber can be drawn in conventional fashion from the preform. Prior to drawing fiber from the preform, the preform can optionally be overclad in conventional fashion with an overclad tube.

In one approach the air holes at one end of the preform are closed off before the fiber is drawn from the other end. In this approach the air holes are substantially self-regulating, making the draw conditions relatively uncritical.

In another approach the air holes are open at the upper end of the preform. This, however, requires drawing under relatively high tension, and thus is currently not preferred.

Figure 6:
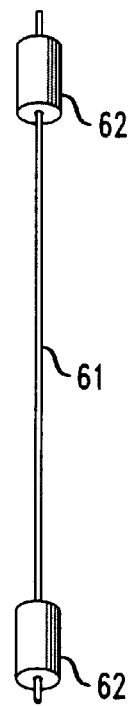
FIGS. 6–8 schematically show steps in an alternative method of disposing the elongate elements.
Figure 7:
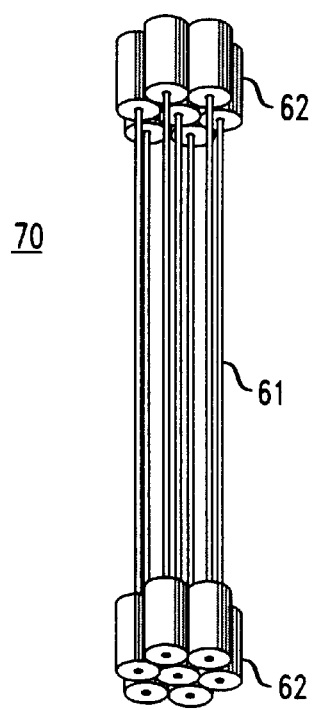
Figure 8:
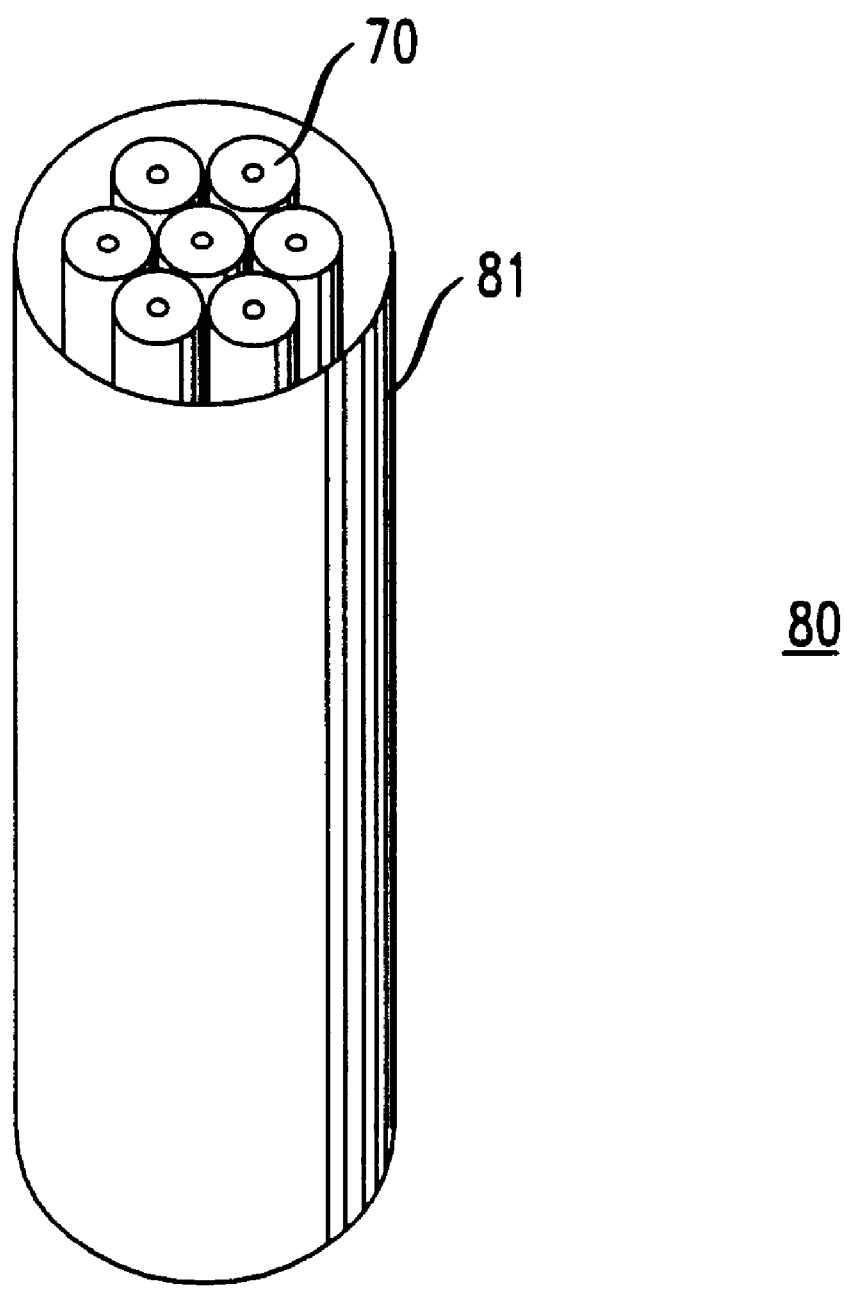

In an alternative approach to assembling and disposing the elongate elements, each elongate element is provided with two or more spacers to be referred to as "ferrules", that serve to maintain the elongate elements in position. This is illustrated in FIGS. 6–8 wherein FIG. 6 schematically depicts a single elongate element 61 with 2 ferrules 62 disposed thereon, FIG. 7 depicts an assembly 70 of elongate elements 61 with ferrules 62 disposed thereon, and FIG. 8 depicts assembly 80 consisting of assembly 70 disposed in vessel 81, ready to receive the sol. Means for removing the elongate elements after gel formation are not shown.

The above described alternative approach can be advantageously used in the manufacture of microstructured fiber having a large number (e.g., hundreds) of air holes. It will be understood that the ferrules need not be of circular cross section but could have other geometries, e.g., square cross section. Indeed, the ferrules need not be all the same, provided the elongate elements are maintained parallel to each other. For instance, by making the ferrules on a given one of the elongate elements larger than the ferrules on the other elements, a "defect" can be introduced into the structure, and the optical properties of the resulting fiber changes thereby.

EXAMPLE I

This example describes making a sintered gel body with a hexagonal array of air holes, and drawing microstructured optical fiber from the sintered gel body. The apparatus was similar to that of FIGS. 1–4.

The vessel (mold) was an acrylic tube of 2.6 cm inner diameter and 25 cm length. The multiplicity of elongate elements consisted of 36 glass rods (0.93 mm diameter, 12 cm long) extending from a 2 cm long cylindrical epoxy resin section into a removable holding fixture. The rods were maintained in the desired hexagonal arrangement by recesses and guide holes in the bottom and top holding fixtures, respectively. The latter also served as a lid. It had 0.05 mm clearance from the mold and thus could slide freely axially, while maintaining vertical, azimuthal and central alignment of the rods. The rods formed a hexagonal array, without the central rod. The spacing between adjacent rod centers was about 2 mm, resulting in 5–10% air volume fraction in the relevant portion of the gel body. The rods and the acrylic mold had a smooth surface finish and were cleaned with deionized water (DIW) and methanol before assembly. Before introduction of the sol into the mold, the rods were coated with silicon spray.

A silica-containing sol was prepared substantially as described in U.S. Pat. Nos. 5,240,488 and 5,379,364. The sol was then poured into the mold, with care taken to avoid entrapment of air. Introduction of the sol through the bottom holding fixture is expected to reduce the possibility of air entrapment and is contemplated. Orifice 17 was located 13 cm above the lower holding fixture and below the epoxy lid. The sol gelled within about 4 minutes. The gel body was allowed to age for about 24 hours. Orifice 17 was plugged to avoid evaporation.

The mold with the gel body therein was placed horizontally into a water bath. The bottom end cap and holding fixture was removed, and pressurized water was introduced through the filling hole, causing the gel body to slide gently into the water bath, while the epoxy lid with the rods slid in the mold away from the gel while maintaining axial, azimuthal and central alignment of the rods. The gel body was then placed on rotating rollers in a drying chamber where it was dried in 80% relative humidity at 20° C. for 7 days.

The thus produced gel body was placed in a furnace and heat treated substantially as disclosed in U.S. Pat. Nos. 5,240,488 and 5,379,364, resulting in a monolithic glass body. The glass body contained 36 axial air holes arranged as the first three layers of a hexagonal array without a center hole. The air hole size and center to center spacing in the glass body were 0.6 and 1.4 mm, respectively.

Fiber is drawn in conventional fashion (see, for instance, U.S. Pat. Nos. 5,907,652 and 5,802,236), but with the air holes at the top of the consolidated body sealed off. Pressure build-up in the sealed-off air holes counter-acts the surface tension force that otherwise might have collapsed the air holes. The fiber draw is conducted at a relatively low temperature and high tension. In another embodiment the holes are left open and the fiber draw is at different temperatures, whereby fiber properties can be controlled during the draw.

FIG, 5 shows the cross-sectional view of the drawn fiber. The outside diameter of the fiber is 125 $\mu$m.

EXAMPLE II

Microstructured optical fiber is produced substantially as described above.

The mold is a cylindrical acrylic tube of 6.3 cm inner diameter and 81 cm length, and the elongate elements are 6 stainless steel rods of 6.5 mm outside diameter, arranged in the form of a hexagon. A 10 cm long TEFLON lid with through-holes maintains, together with a bottom fixture, the rods in vertical, azimuthal and central alignment. Before introduction of the sol into the mold, a known polyethylene glycol mold release is applied to the rods.

Sol is produced substantially as described in U.S. Pat. Nos. 5,240,488 and 5,379,364, and is introduced into the vessel. Gelation occurred within about 10 minutes. After drying of the gel body, the body is heat treated, including purification and sintering, substantially as disclosed in U.S. Pat. No. 5,240,488 and 5,379,364. From the thus produced glass body with axial air holes, microstructured optical fiber is drawn in conventional fashion.

EXAMPLE III

Microstructured optical fiber is produced substantially as in Example II, except that 6 stainless steel rods of 4.8 mm diameter served as the elongate elements, with the rods arranged irregularly, with no two rods having the same distance from the axis. This demonstrates the possibility of producing microstructured fiber with irregular disposition of the air holes.

At times it may be desirable to enlarge the axial through-holes in the glass body (preform). This is readily accomplished, as shown by the following example.

EXAMPLE IV

A length of the preform of Example I (hole size a=0.6 mm, center-to-center spacing d=1.4 mm, a/d=0.43, air volume about 17%) is etched at room temperature. The etching solution is 32.5% b.v. HF (50%), 20.25% b.v. DIW, 47.25% b.v. sulfuric acid (98.4%). The following procedure is followed: etching 15 min., DIW rinsing in ultrasonic bath, 45 min. etching, DIW rinsing in ultrasonic bath, 40 min. etching in ultrasonic bath, DIW rinsing in ultrasonic bath. The average etching rate in this procedure is 0.17 mm/hr. In 50% HF solution the etching rate is about 0.25 mm/hr. After completion of etching the hole diameter is 1.1 mm, a/d is 0.79, and the air volume has increased to about 60%.

EXAMPLE V

Microstructured optical fiber is made substantially as shown in FIGS. 6–8. 128 elongate elements, each having an outside diameter of 0.56 mm, are provided with identical ferrules of outside diameter 0.88 mm, and are arranged around a single larger elongate element of 3 mm outside diameter. This assembly is then clamped together and positioned in a mold for casting. Sol is poured into the mold and allowed to gel. After formation of the gel body, the elongate elements are pulled up from the mold individually or in small groups. The gel body is then placed on rollers under water, dried and sintered similar to Example I. Fiber is drawn from the thus produced glass preform.

Those skilled in the art will realize that mechanical separation of the elongate elements from the gel body is not the only possible separation method. For instance, the elements can consist of a polymer (e.g. NYLON-6), and the elements can be removed from the gel body by chemical or thermal action, e.g., by exposure of the assembly to an appropriate solvent (e.g., cresol, phenol, or formic acid), or by pyrolysis.

The elongate elements desirably have a smooth surface to facilitate separation of the elements from the gel body. Thus, mechanical or electrochemical polishing of the elements is frequently indicated.

The separation of the elongate elements from the gel body can be facilitated by application of a mold release compound (e.g., polyethylene glycol, silicone spray, TEFLON spray, or Cr coating) to the elements prior to the introduction of the sol into the mold.

The microstructured fibers produced according to the invention can be used in substantially the same way as fibers produced by the prior art "bundle and overclad" method, but can also be used in novel ways. For instance, the elongate elements can be irregularly disposed.

We claim:

1. Method of making microstructured optical fiber comprising:

a) providing a tubular vessel having a length, and also providing a multiplicity of elongate elements extending at least a portion of said length and being maintained in a predetermined spatial arrangement with respect to the vessel;

b) filling at least a portion of said vessel with a silica-containing sol, and permitting or causing said sol to gel, such that a gel body with said multiplicity of elongate elements results;

c) separating said gel body from said elongate element or elements and from said vessel; and d) drying, purifying and sintering said gel body, and drawing said microstructured optical fiber from said sintered gel body.

2. Method of claim 1, wherein said elongate elements are rods or tubes or wires or fibers that are maintained in said predetermined arrangement by holding fixtures, and wherein step c) comprises withdrawing said rods or tubes or wires or fibers from the gel body.

3. Method of claim 1, wherein said elongate elements are irregularly disposed with respect to said tubular vessel.

4. Method of claim 1, wherein said elongate elements are chemically or thermally removable elements, and the method comprises chemically or thermally removing the elongate elements after gelation of the sol.

5. Method of claim 1, wherein said sol comprises colloidal silica.

6. Method of claim 1, wherein said removing step comprises injecting a pressurized liquid between said gel body and a holding fixture.

7. Method of claim 1, wherein said separating step comprises depositing said gel body into a water bath.

8. Method of claim 1, wherein said multiplicity of elongate elements comprises two or more elements that differ in size and/or shape from each other.

9. Method of claim 1, wherein one or more of said elongate elements is/are removed from the gel body prior to removal of the gel body from said vessel.

10. Method of claim 1, wherein the sintered gel body is overclad with an overclad tube prior to fiber drawing.

11. Method of claim 1 wherein the sol is introduced into said vessel through an opening located at or near the bottom of the vessel.

12. Method of claim 1, wherein step a) comprises providing substantially each elongate element with two or more ferrules adapted for maintaining a predetermined spacing between adjacent elongate elements, and further comprises securing together said elongate elements with said ferrules thereon, such that a bundle of said elongate elements is formed, with the elongate elements in said bundle being maintained spaced apart and parallel to each other; and still further comprises introducing said bundle into said vessel.

* * * * *